United States Patent [19]
Friedline

[11] 4,068,976
[45] Jan. 17, 1978

[54] CUTTING INSERT CONFIGURATION
[75] Inventor: Ernest J. Friedline, Latrobe, Pa.
[73] Assignee: Kennametal Inc., Latrobe, Pa.
[21] Appl. No.: 700,877
[22] Filed: June 29, 1976
[51] Int. Cl.² .............................................. B26D 1/00
[52] U.S. Cl. .................................................. 407/114
[58] Field of Search ....................................... 29/95 R
[56] References Cited
U.S. PATENT DOCUMENTS

| | | | |
|---|---|---|---|
| 3,574,911 | 4/1971 | Penoyar | 29/95 R |
| 3,636,602 | 1/1972 | Owen | 29/95 R |
| 3,875,631 | 4/1975 | Malinchak | 29/95 R |

Primary Examiner—Harrison L. Hinson
Attorney, Agent, or Firm—Melvin A. Crosby; Lawrence R. Burns

[57] ABSTRACT

A cutting insert, especially for milling cutters or the like, which is receivable in a holder and which insert has linear edge portions which meet at the corners of the insert. The insert is indexable in the holder to present a selected edge to work to be done. Each of the edges of the inserts are serrated or notched with respective edges embodying different numbers of serrations or notches so that the inserts can be arranged in the holder to cut completely across a surface with each insert taking only a portion of the surface.

5 Claims, 5 Drawing Figures

CUTTING INSERT CONFIGURATION

The present invention relates to cutting inserts, and is especially concerned with cutting inserts which are used in multiple, as in connection with milling cutters or the like.

Inserts are known for milling cutters and the like in which the edges of the inserts are grooved or serrated with the inserts being so aligned that the portion of a surface being cut which is reached by one insert is taken by one or more following inserts, thus, providing for a planar cut.

The present invention has as a primary objective the provision of an improved insert of simplified construction which can be molded as from hard carbide material and sintered to form a finished insert.

BRIEF SUMMARY OF THE INVENTION

According to the present invention, a hard wear resistant cutting insert is provided which has faces on opposite sides facing in opposite directions and a peripheral surface extending between the faces. When viewed perpendicular to a face, the insert is polygonal, preferably, rectangular, and each edge of the insert between the respective corners is notched or grooved so that, when that particular edge of the insert engages a surface being worked, the regions of the edge between the notches or grooves will remove material from the workpiece while material will not be removed from the workpiece in the region of the notches or grooves.

When two such inserts are arranged in tandem with one following the other in spaced relation, the second insert is arranged to remove those portions of the workpiece left by the preceding insert, and with this in mind, the several edges of the inserts have at least two different numbers of grooves formed therein so that a pair of inserts can be arranged in different indexed positions and the following insert will remove what is left on the workpiece by the preceding insert.

In this manner, the holders for the inserts can be arranged to locate the inserts in a precise position by means of abutments and the insert clamped in the position and the inserts will be aligned to cooperate in the aforementioned manner.

This arrangement greatly simplifies the setting up of a milling cutter or the like in which the inserts are provided with grooves in the edges to distribute the cutting rod between the inserts.

The exact nature of the present invention will become more clearly apparent upon reference to the following detailed specification taken in connection with the accompanying drawings in which.

DETAILED DESCRIPTION OF THE INVENTION

Figure 1:
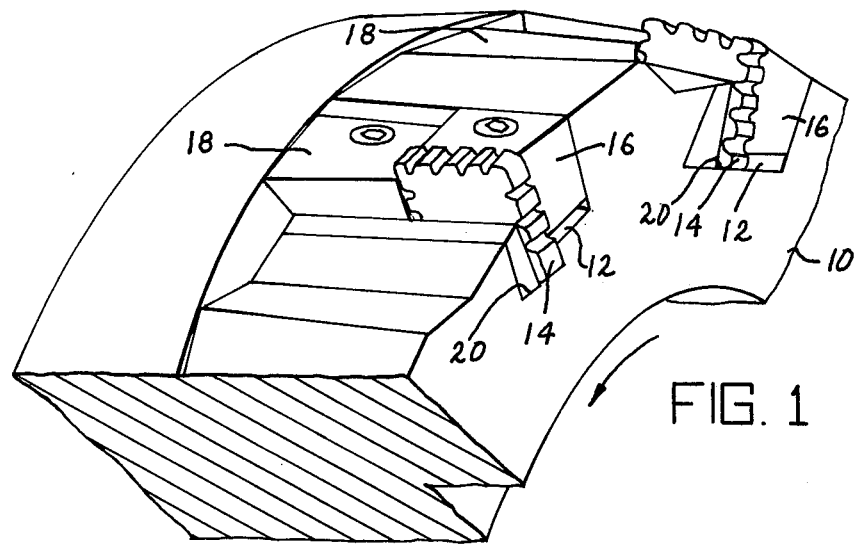
FIG. 1 is a fragmentary perspective view of a milling cutter having inserts according to the present invention mounted in two adjacent ones of the pockets which are distributed around the periphery of the body.
Figure 2:
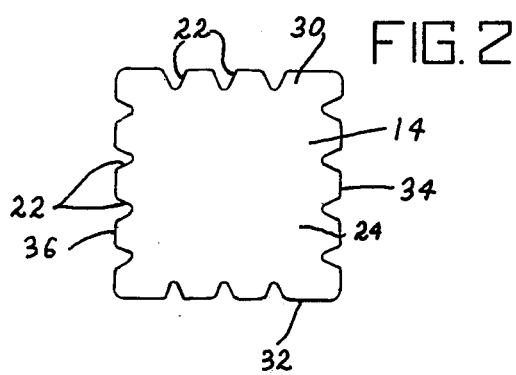
FIGS. 2 and 3 are front and side views, respectively, of a typical insert according to the present invention.
Figure 3:
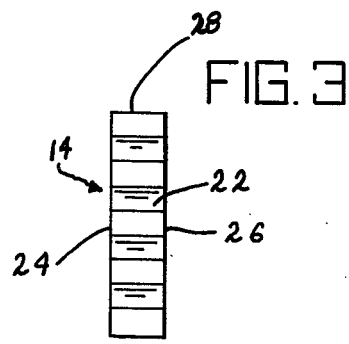

Referring to the drawings somewhat more in detail, 10 represents the body of a rotary cutter such as a milling cutter. The body 10 is provided with circumferentially distributed notches or pockets 12 and a respective cutting insert 14 is disposed in each pocket and is fixedly clamped against the leading side of the pocket by a wedge element 16 disposed on the rearward side of the insert.

The axially inner edge of each insert is abutted by an abutment element 18 mounted in the pertaining pocket. The inserts in the radially inward direction abut the bottom surfaces 20 of the respective pockets and are, thus, located in a predetermined axial direction on the cutter body and in a predetermined radial direction so that, when the inserts are clamped up, the inserts will be in precisely aligned relative positions if the inserts are all of the same size and shape.

According to the present invention, each insert 14, which is preferably polygonal and, more preferably still, rectangular, has grooves 22 formed in the edges thereof, with different numbers of grooves in the respective edges. The grooves extend perpendicularly to the opposite faces 24 and 26 of the insert and interrupt the peripheral wall 28 of the insert in such a manner that a respective edge of the insert will engage only spaced portions of a workpiece being machined.

Figure 4:
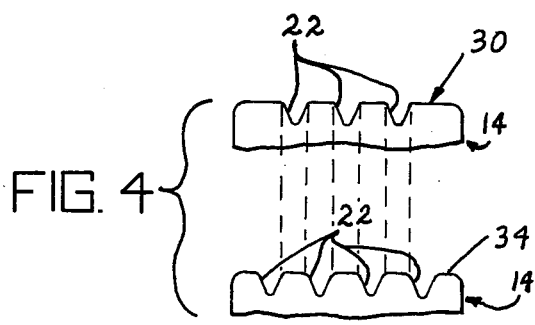
FIG. 4 shows two different insert edges and illustrates how the cutting portion of one edge will remove material which is left by the notches in the next preceding insert.

As will be seen in FIG. 4, a pair of insert edges or peripheral wall segments of the insert, such as the wall segments indicated at 30 and 32, have only three of the notches 22 formed therein whereas the other peripheral wall segments, indicated at 34 and 36, each have four of the notches or grooves 22 formed therein.

By utilizing the insert configuration illustrated, two succeeding pockets in a milling cutter, such as the two pockets shown in FIG. 1, can receive inserts 14 indexed to present respective peripheral wall segments and the two inserts, taken together, will cover the entire width of the region of the workpiece being machined. For example, in FIG. 1, the leading insert 14 has four notches presented in the radially outermost peripheral wall segment and the trailing insert 14 has three such grooves in its radially outermost peripheral wall segment.

As will be seen in FIG. 4, the material left by the grooves in either of the inserts will be removed by the other, depending on which one of the insert configurations is in the leading position.

The inserts, as mentioned, can readily be indexed to present all of the edges thereof and can also be turned front to back so that each insert has eight effective edges that can be presented to the workpiece.

Figure 5:
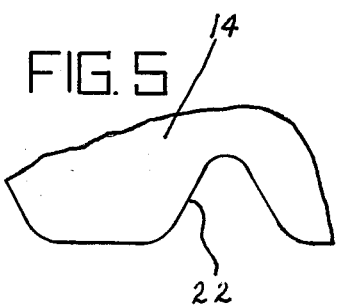
FIG. 5 is a view drawn at somewhat enlarged scale showing the manner in which the notches are formed in the inserts.

FIG. 5 shows in more detail the manner in which the groove 22 is formed in an insert 14. It will be seen that all sharp corners are eliminated from the groove to minimize any tendency for the insert to chip at the corners of the groove.

Insert arrangements in which each insert takes a portion only of the surface being machined are known, but the insert of the present invention differs therefrom in that flat regions of substantial length are provided between adjacent ones of the notches or grooves formed in the periphery of the insert. In this manner, two only of the inserts are necessary to completely sweep a surface being machined.

The importance of the notches or recesses in the periphery of the inserts will be appreciated in connection with the use of the insert in, for example, a milling cutter where the loading on each insert is interrupted and intermittent. Under these circumstances, it is preferable that the entire length of the cutting edge of an insert not be subjected to loading but, rather, only a portion thereof as the insert engages the work.

While the particular embodiment of the insert according to the present invention has been shown and described having one side with four notches therein and an adjacent side with three notches therein, it will be understood by one of ordinary skill in the art that the number of notches can vary. For instance, the insert may have n notches on one side and n plus m notches as long as the numerals n and m stand for integers which are unequal. Thus, the number of notches on one side of the insert will always be unequal to the number of notches on an adjacent or opposite side of the insert.

Modifications may be made within the scope of the appended claims.

What is claimed is:

1. An even sided polygonal cutting insert formed of a hard wear resistant material and comprising a body having substantially parallel polygonal faces connected by a peripheral wall which forms cutting edges at the juncture thereof with at least one of said faces, the peripheral wall having notches formed therein extending transversely to said faces and interrupting the cutting edge in regions uniformly spaced therealong and having n notches interrupting a pair of cutting edges on one face and n plus m notches interrupting another pair of cutting edges on said one face, the notches interrupting said pair of cutting edges on said one face being staggered relative to the notches interrupting said another pair when said edges are viewed in superposed relation.

2. A cutting insert according to claim 1 in which $m$ equals one.

3. A cutting insert according to claim 1 in which $n$ is equal to at least two and $m$ is equal to at least one.

4. A cutting insert according to claim 1 in which $n$ is three and $m$ is one.

5. A cutting insert according to claim 1 in which the cutting edges which are interrupted by a corresponding number of notches are the oppositely disposed cutting edges of the insert.

* * * * *

Notice of Adverse Decision in Interference

In Interference No. 100,280, involving Patent No. 4,068,976, E. J. Friedline, CUTTING INSERT CONFIGURATION, final judgment adverse to the patentee was rendered Mar. 7, 1980, as to claims 1–5.

[*Official Gazette June 10, 1980.*]